No. 757,439. PATENTED APR. 19, 1904.
F. CONRAD.
PREPAYMENT ELECTRICAL MEASURING INSTRUMENT.
APPLICATION FILED JUNE 24, 1903.
NO MODEL. 3 SHEETS—SHEET 1.

WITNESSES:
E. L. Belcher
Birney Hines

INVENTOR
Frank Conrad
BY
Wesley G. Carr
ATTORNEY.

No. 757,439. PATENTED APR. 19, 1904.
F. CONRAD.
PREPAYMENT ELECTRICAL MEASURING INSTRUMENT.
APPLICATION FILED JUNE 24, 1903.
NO MODEL. 3 SHEETS—SHEET 2.
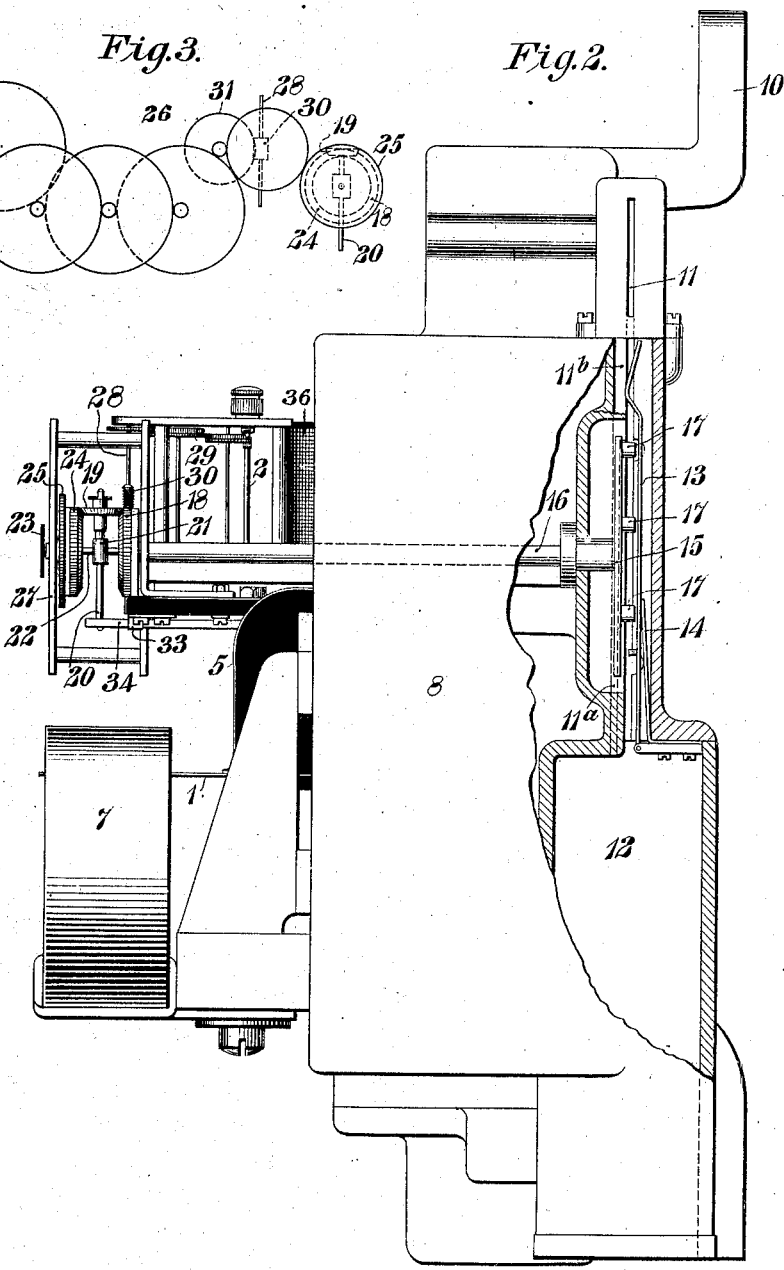
WITNESSES:
C. L. Belcher
Birney Hines
INVENTOR
Frank Conrad
BY
Wesley G. Carr
ATTORNEY.

No. 757,439. PATENTED APR. 19, 1904.
F. CONRAD.
PREPAYMENT ELECTRICAL MEASURING INSTRUMENT.
APPLICATION FILED JUNE 24, 1903.
NO MODEL.
3 SHEETS—SHEET 3.

WITNESSES:
C. L. Belcher
Birney Hines

INVENTOR
Frank Conrad
BY
Wesley G. Carr
ATTORNEY.

No. 757,439.                                                    Patented April 19, 1904.

UNITED STATES PATENT OFFICE.

FRANK CONRAD, OF EDGEWOOD PARK, PENNSYLVANIA, ASSIGNOR TO WESTINGHOUSE ELECTRIC & MANUFACTURING COMPANY, A CORPORATION OF PENNSYLVANIA.

PREPAYMENT ELECTRICAL MEASURING INSTRUMENT.

SPECIFICATION forming part of Letters Patent No. 757,439, dated April 19, 1904.

Application filed June 24, 1903. Serial No. 162,906. (No model.)

*To all whom it may concern:*

Be it known that I, FRANK CONRAD, a citizen of the United States, and a resident of Edgewood Park, in the county of Allegheny and State of Pennsylvania, have invented a new and useful Improvement in Prepayment Electrical Measuring Instruments, of which the following is a specification.

My invention relates to electrical measuring instruments of the integrating or registering type; and it has for its object to provide a comparatively simple and inexpensive prepayment mechanism which shall be certain and reliable in operation, and thus enable the user to secure exactly the amount of electrical energy represented by the value of the coin or coins deposited in the instrument.

My invention is illustrated as applied to a Westinghouse integrating wattmeter and will be so described, without any intention, however, of limiting its scope as regards the specific type of instrument to which it is applied.

Figure 1:
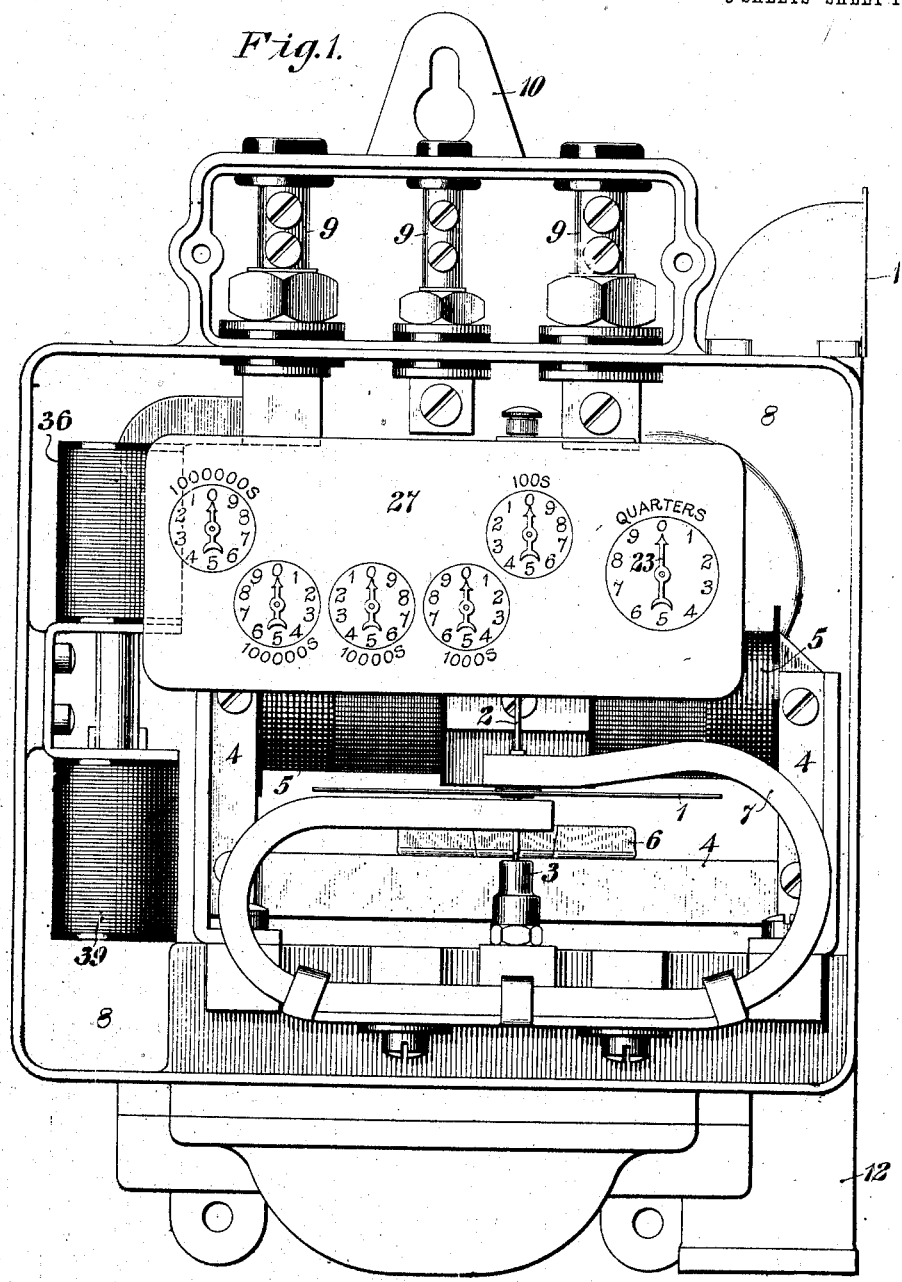
Figure 4:
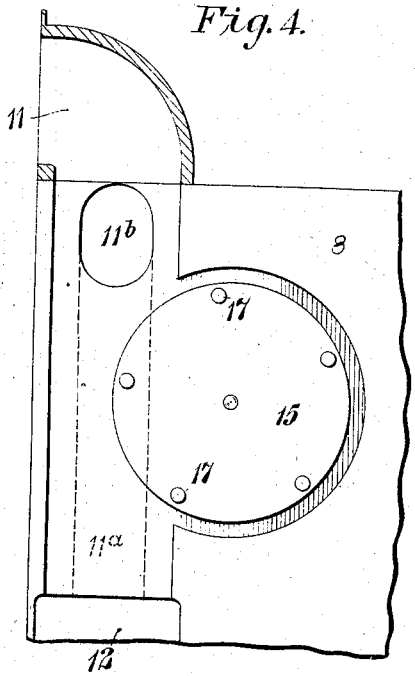
Figure 5:
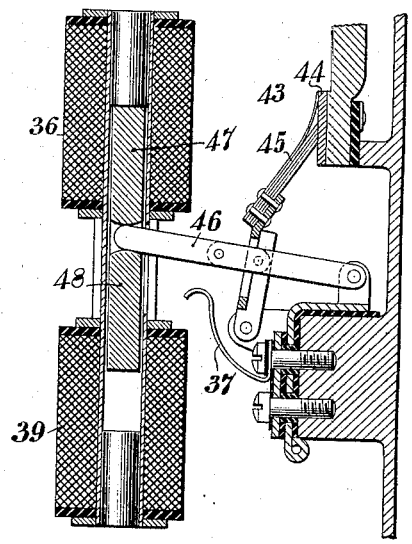
Figure 6:
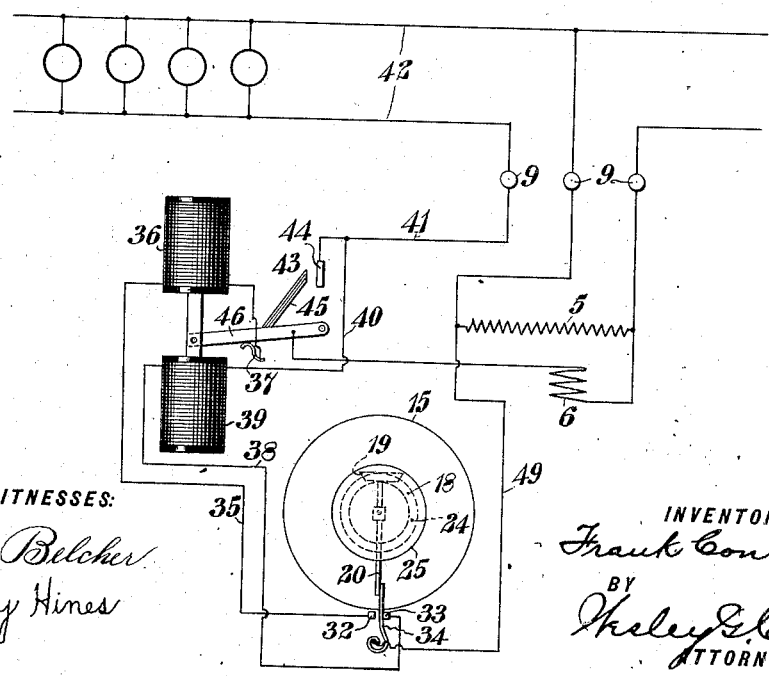

In the accompanying drawings, Figure 1 is a front elevation of a wattmeter provided with my improvement, the front portion of the casing being removed. Fig. 2 is a view, partially in side elevation and partially in section, of the instrument and portion of casing shown in Fig. 1. Fig. 3 is a diagrammatic representation of the train of gearing for operating the registering devices. Fig. 4 is a detail sectional view of a portion of the coin-chute and coöperating wheel. Fig. 5 is a sectional view of electromagnetic means for making and breaking the circuit of the instrument, and Fig. 6 is a diagram of the electrical circuits of the measuring instrument and the means for making and breaking the same.

The instrument here shown, except as regards the prepayment features, which constitute my present invention, is in all essential features like that set forth in Patent No. 608,842, granted to the Westinghouse Electric & Manufacturing Company August 9, 1898, upon an application filed by H. P. Davis and myself, the main portions of the instrument being a rotatable disk armature 1, a spindle or shaft 2 therefor, having a jewel step-bearing 3, a magnetizable laminated core 4, a shunt-connected winding 5, a series-connected coil 6, and a damping-magnet 7, all supported in suitable coöperative relation upon a frame 8, which constitutes the back portion of the casing of the instrument. This frame or base portion 8 is provided with three terminal posts 9 and with a perforated lug 10, by means of which the instrument may be supported.

As above stated, the parts thus far enumerated are the usual features of standard Westinghouse wattmeters and operate in the usual way in connection with a counting-train to measure the energy of the circuit to which the instrument is connected. In order to so utilize this instrument as to supply to the customer definite amounts of energy as paid for, I provide attachments which will be now described. The frame or casing 8 is provided at its rear with a coin-chute 11, the lower end of which opens into a receptacle 12, which may be of such dimensions as to hold the desired number of coins, the latter being removed at desired intervals by any person having the necessary means for securing access thereto.

Projecting into the coin-chute 11 is an arm 13, which is pivotally supported at its lower end and the upper end of which is normally held in the position indicated in Fig. 2 by a spring 14. A coin wheel or disk 15 is mounted upon one end of a horizontal shaft 16 and is provided with a series of pins 17, which project into the coin-chute in position to be successively engaged by coins dropped into the chute, the pins being of such number and so spaced with reference to the size of the wheel that a coin the size and weight of which are sufficient to move the wheel will cause such a degree of movement as will bring the next succeeding pin into position to be engaged by the next coin which may be introduced into the chute. The shaft 16 is so journaled as to be easily rotated by the force due to the weight of a coin of proper dimensions.

In order to guard against the effective use of coins having smaller dimensions than those of the coins for which the mechanism is intended, I provide a supplemental coin-chute 11ᵃ at one side of the wheel 15, the upper entrance 11ᵇ to which is of oblong shape and of such width that it will admit coins that are smaller than those which may be properly used, but will not admit coins of the proper diameter. The upper bent end of the arm 13 will serve to divert small coins into the supplemental chute, but will be easily deflected by coins of proper size sufficiently to permit such coins to drop into engagement with the pins 17.

Rigidly mounted upon the front end of the shaft 16 is a bevel gear-wheel 18, which meshes with an idler-pinion 19, the latter being journaled upon a rod 20, having an enlarged portion 21, which is rigidly supported upon a short shaft or spindle 22, provided at its front end with a hand or pointer 23 and having a bearing at its other end in the end of the shaft 16 or the gear-wheel 18.

Suitably journaled with its axis in alinement with that of the shaft 16 is a bevel gear-wheel 24, which meshes with the idler-pinion 19. Rigidly connected to the bevel gear-wheel 24 is a gear-wheel 25, which constitutes one of the train of gears 26. (Shown in Fig. 3.) The latter, with the exception of the gear-wheel 25, constitutes the means for operating the registering-hands on the dial-plate 27 of the instrument.

The rotative movement of the disk armature 1 of the meter is transmitted from the spindle 2 to a spindle 28 by means of a train of gears 29, and the said spindle 28 is provided with a worm 30, which engages with a worm-wheel 31, and the latter drives the train of gears 26, as is indicated in Fig. 3.

Adjacent to the lower end of the rod 20 when it is in a vertical position with the idler-pinion 19 at its upper end are two stationary contact-terminals 32 and 33, and between these contact-terminals projects a spring-arm 34, the spring action of which tends to hold it in engagement with the contact-terminal 32. It, however, projects into the path of movement of the rod 20, so that when the latter is moved in a contra-clockwise direction it will force the contact-arm into engagement with the contact-terminal 33.

As will be seen by reference to Figs. 5 and 6, the contact-terminal 32 is connected, by means of a suitable conductor 35, to one terminal of a solenoid 36, to the other terminal of which is connected a stationary spring contact-piece 37. The stationary contact-terminal 33 is similarly connected, by means of a suitable conductor 38, to one terminal of a second solenoid 39, the other terminal of which is connected, by means of two conductors 40 and 41, to one of the binding-posts 9, by means of which connection is made to the main circuit 42, the energy of which is measured by the instrument.

The circuit through the series coil 6 of the instrument is made and broken by means of a circuit-breaker 43, the stationary contact-terminal 44 of which is connected to one end of the conductor 41 and the movable contact member 45 of which is so supported as to be operated by an arm 46, the free end of which has a movable connection with the cores 47 and 48 of the respective solenoids 36 and 39 and when in its lowest position makes engagement with the spring contact-piece 37.

The operation is as follows: When a coin of the proper dimensions and weight is inserted into the coin-chute 11, it engages the pin 17 on the wheel 15 which is at the time in the path of movement of the coin, thus rotating the wheel, and with it the shaft 16 and bevel gear-wheel 18, the rotation of the latter serving to move the idler-pinion 19 a corresponding distance along the periphery of the at that time stationary gear-wheel 24. With the parts in the position indicated diagrammatically in Fig. 6 this movement of the idler-pinion will carry the rod 20 in a clockwise direction a corresponding distance, and the spring action of the arm 34 will move it into engagement with the contact-terminal 32, thus closing the circuit of the solenoid 36 through the spring contact-piece 37 and the arm 46. This energizing of the solenoid 36 serves to draw the solenoid-cores upward, and thus close the circuit-breaker and complete the circuit of the series coil of the instrument directly through the circuit-breaker. The insertion of another coin or of several such coins will serve to rotate the parts in the same manner to a degree corresponding to the number of coins inserted, and such movement of the parts serves to move the pointer 23 a corresponding distance, and thus to indicate on the dial-plate the number of coins that have been introduced. The use of energy by translating devices will now obviously set the counting-train 26 in operation, and since the bevel gear-wheel 18 will now be stationary the movement of the counting-train will serve to carry the idler-pinion and the rod 20 in a contra-clockwise direction, and thus move the indicating-hand 23 until the amount of energy represented by the coins which have been introduced has been used. When this point is reached, the hand will indicate zero, and the rod 20 will move the spring contact-arm 34 over into engagement with the stationary contact-terminal 33, thus closing the circuit through the conductors 49, 38, 40, and 41 and the solenoid 39. The latter will pull its core 48 downward, and thus effect the opening of the circuit-breaker and prevent further registration until another coin is introduced, since the instrument will not operate under the action of the shunt-winding alone.

The amount of energy which will pass through the meter before the spring-arm 34 is moved into contact with the stationary terminal 33 will depend upon the ratio of the counting-train and the degree of rotation which has been given to the disk 15. In order to move the rod 20 through one revolution, two revolutions of the disk 15 will be required, and with five pins on the disk it is evident that ten coins may be deposited in the meter and be registered by the pointer 23. This will require two complete rotations of the gear-wheel 24 in order to bring the spring-arm 34 against the contact 33.

If more than ten coins be placed in the coin-slot, the spring-arm 34 will be merely held in contact with the terminal 32 and the coins be prevented from passing down the slot, since the disk 15 cannot be rotated. As the energy is recorded, however, by the meter, the rotation of the gear-wheel 24 will permit the disk 15 to rotate, and thus pass the next coin through the slot when an equivalent amount of energy has passed through the meter.

While the details of construction shown and described are such as have been devised in the practical development of apparatus for commercial service and are therefore known to be desirable and effective, it is not desired or intended to limit the invention to such exact details, since variations therefrom may be made without departing from the spirit and scope of the invention.

I claim as my invention—

1. In a prepayment electrical measuring instrument, the combination with a switch for making and breaking the main circuit of the instrument and two electromagnets for respectively and positively moving said switch to its circuit-opening and its circuit-closing positions, of a counting-train, a coin-actuated member, a device for closing the circuit of each magnet and for opening that of the other, operating connections between the coin-actuated member and said device and operating connections between the counting-train and said device.

2. In a prepayment electric wattmeter, the combination with a switch for making and breaking the series circuit of the instrument and two electromagnets for respectively and positively opening and closing said switch, of a circuit-controller for said magnets, a coin-actuated member, a counting-train, operating connections between the coin-actuated member and the circuit-controller and operating connections between the counting-train and said controller.

3. In a prepayment-wattmeter, the combination with two electromagnets for respectively making and breaking the series circuit of the meter and a switch for making the circuit of either magnet and breaking that of the other, of a coin-chute and a coin-operated wheel located therein and having a shaft, a device for operating said switch geared to said shaft, a counting-train and gearing between the same and said switch-operating device.

4. In a prepayment-wattmeter, the combination with a device for opening and closing the series circuit of the meter comprising two solenoids, a single core therefor and a movable contact-terminal connected to said core, of a coin-chute, a coin-operated wheel therein having a shaft, a switch for closing the circuit of either solenoid and opening that of the other, a rotatable member for controlling said switch geared to the shaft of the coin-actuated wheel, a counting-train and gearing between the same and the said rotatable member.

5. In a prepayment-wattmeter, the combination with two electromagnets for respectively making and breaking the series circuit of the meter and a single switch for making and breaking the circuits of both magnets, of a rotatable controlling device for said switch having an idler-pinion, a coin-actuated wheel geared to said pinion to rotate the controlling device in one direction and a counting-train geared to said pinion to rotate the controlling device in the other direction.

6. In a prepayment, electrical measuring instrument, the combination with means for making and breaking the circuit of an actuating-winding of the instrument, of a rotatable controlling device having an idler-pinion, a coin-actuated wheel geared to said pinion to rotate the controlling device in one direction and a counting-train geared to said pinion to rotate the controlling device in the other direction.

7. In a prepayment electrical measuring instrument, the combination with registering mechanism and actuating-coils therefor, of electromagnetic means for opening and closing an actuating-circuit, a switch for making and breaking the circuits of said electromagnetic means, a rotatable controlling device for said switch having an idler-pinion, a coin-actuated wheel geared to said pinion to rotate the controlling device in one direction and connections between said pinion and the registering mechanism whereby the controlling device is rotated in the opposite direction.

8. In a prepayment, electrical measuring instrument, the combination with a counting-train, a rotatable armature and actuating-coils therefor, of electromagnetic means for making and breaking the circuit of one or more of said coils, a switch for opening and closing the circuits of said electromagnetic means, a controlling device for said switch having an idler-pinion, a coin-actuated wheel geared to said pinion to rotate said controlling device in one direction and connections between said pinion and the counting-train whereby the latter rotates the controlling device in the opposite direction.

9. In a prepayment electric meter, the combination with a motor and a registering means operated thereby, of a switch for opening and closing the motor-circuit, two electromagnets for respectively and positively moving said switch in opposite directions, a coin-operated device, a circuit-controller for said magnets, and two sets of operating connections for said circuit-controller, one to the coin-operated device and the other to the registering means and each movable independently of the other.

In testimony whereof I have hereunto subscribed my name this 3d day of June, 1903.

FRANK CONRAD.

Witnesses:
 BIRNEY HINES,
 J. C. MORSE.